May 13, 1930.  R. L. TULLIS  1,758,415
BIRD CAGE
Filed Feb. 12, 1927  3 Sheets-Sheet 2

Inventor
Rose L. Tullis
By Rockwell & Bartholow
Attorneys

May 13, 1930.  R. L. TULLIS  1,758,415
BIRD CAGE
Filed Feb. 12, 1927   3 Sheets-Sheet 3

Inventor
Ross L. Tullis
By Rockwell + Bartholow
Attorneys

Patented May 13, 1930

1,758,415

UNITED STATES PATENT OFFICE

ROSS L. TULLIS, OF NEW HAVEN, CONNECTICUT, ASSIGNOR TO THE ANDREW B. HENDRYX COMPANY, OF NEW HAVEN, CONNECTICUT, A CORPORATION OF CONNECTICUT

BIRD CAGE

Application filed February 12, 1927. Serial No. 167,828.

This invention relates to bird cages and the like, and while the embodiment of my invention which I have selected to illustrate and describe pertains to a cage made of pyralin or a similar substance, such as one of the cellulose esters, it will be understood that many features of the invention will be applicable as well to cages made of other material. Cages made of pyralin or a similar substance, have many advantages, some of which reside in the fact that they may readily be constructed in a great variety of colors and combinations of colors, they may be given and will retain a high lustre and they will present a very ornate and attractive appearance, as well as being very durable and readily cleaned and polished. Moreover, the nature of this material is such that the crossed members of the cage may be very easily joined together by the use of a solvent which causes the material of the crossed members to flow together and unite so as to form a substantially one-piece or integral structure.

One object of my invention is to improve generally the construction of a bird cage, by the provision of a structure which will be of very pleasing appearance and of sanitary construction, as well as one which will be durable and easily cleaned.

Another object of my invention is to improve the construction of the lower section or bottom of the cage.

A still further object of the invention is to provide improved latching means for securing the bottom of the cage to the body portion thereof.

Still other objects of the invention are to provide improved roosts upon the bottom of the cage, improved means for holding the seed guards in place, improved means for attaching the vertical bars to the horizontal rails, and for mounting the feed cups on the cage.

To these and other ends, the invention consists in the novel features and combinations of parts to be hereinafter described and claimed.

Figure 1:
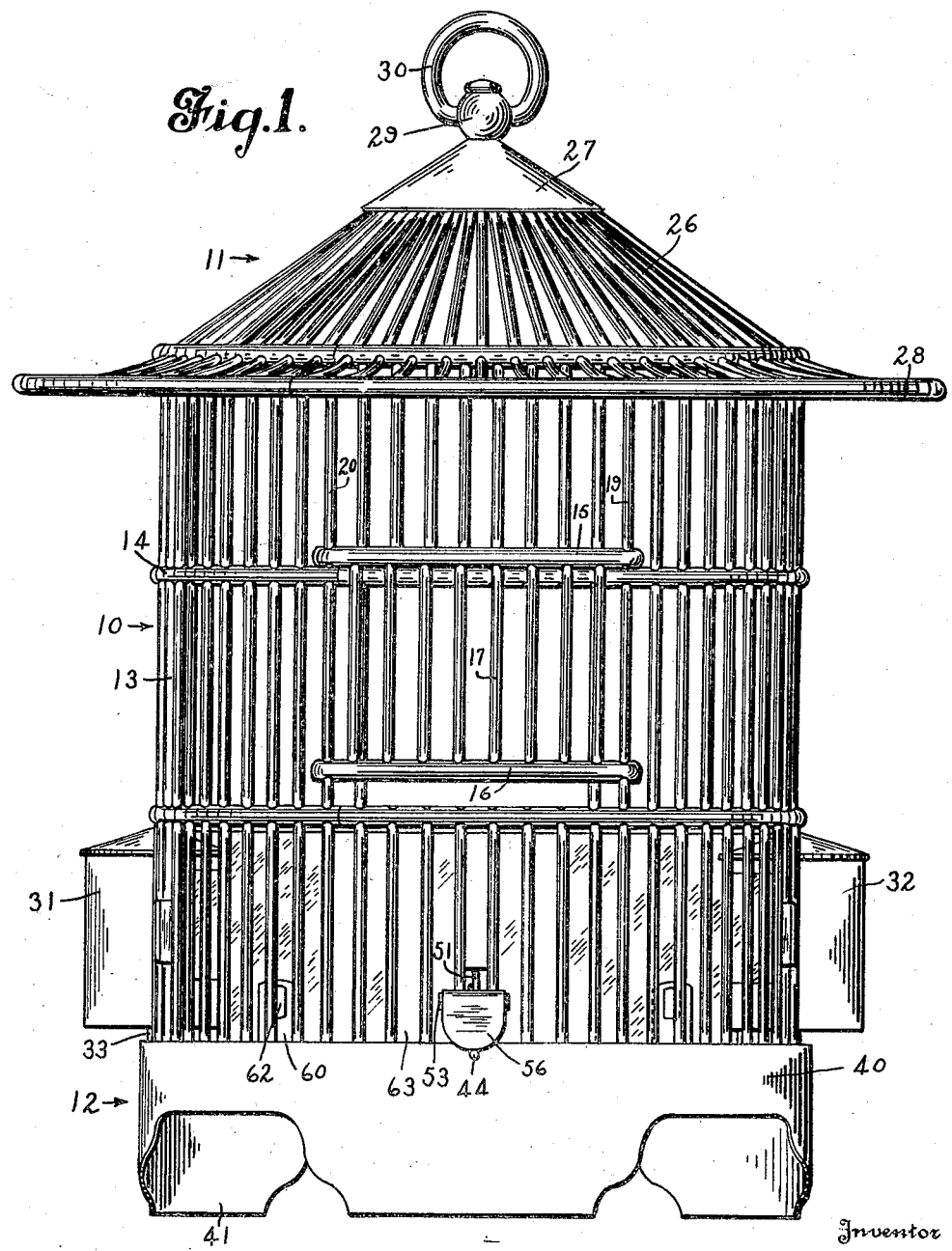
Fig. 1 is a side elevational view of a bird cage, embodying my invention.

The bird cage as shown in Fig. 1, comprises a body portion 10, a top portion 11, and a bottom 12. The body portion of the cage consists generally of vertical or upright bars 13, and horizontally disposed rails 14, to which the bars are secured. As shown, there are four of the horizontal rails, one at the bottom and one at the top of the body portion of the cage, and two arranged intermediate the top and bottom rails, so as to prevent the spreading of the vertical rods. An opening is provided at the front of the cage where the vertical bars terminate at the intermediate rails, so that the space between these rails is left open and access may thus be had to the interior of the cage. This opening is closed by a door consisting of the two rails 15 and 16, joined by the rods 17. The ends of the rails 15 and 16 are curved inwardly and are provided with perforations to receive the adjacent rods 19 and 20, whereby the door slides freely upon these rods and may be opened at will. It is retained in its closed position, as shown in Fig. 1, by gravity.

Figure 2:
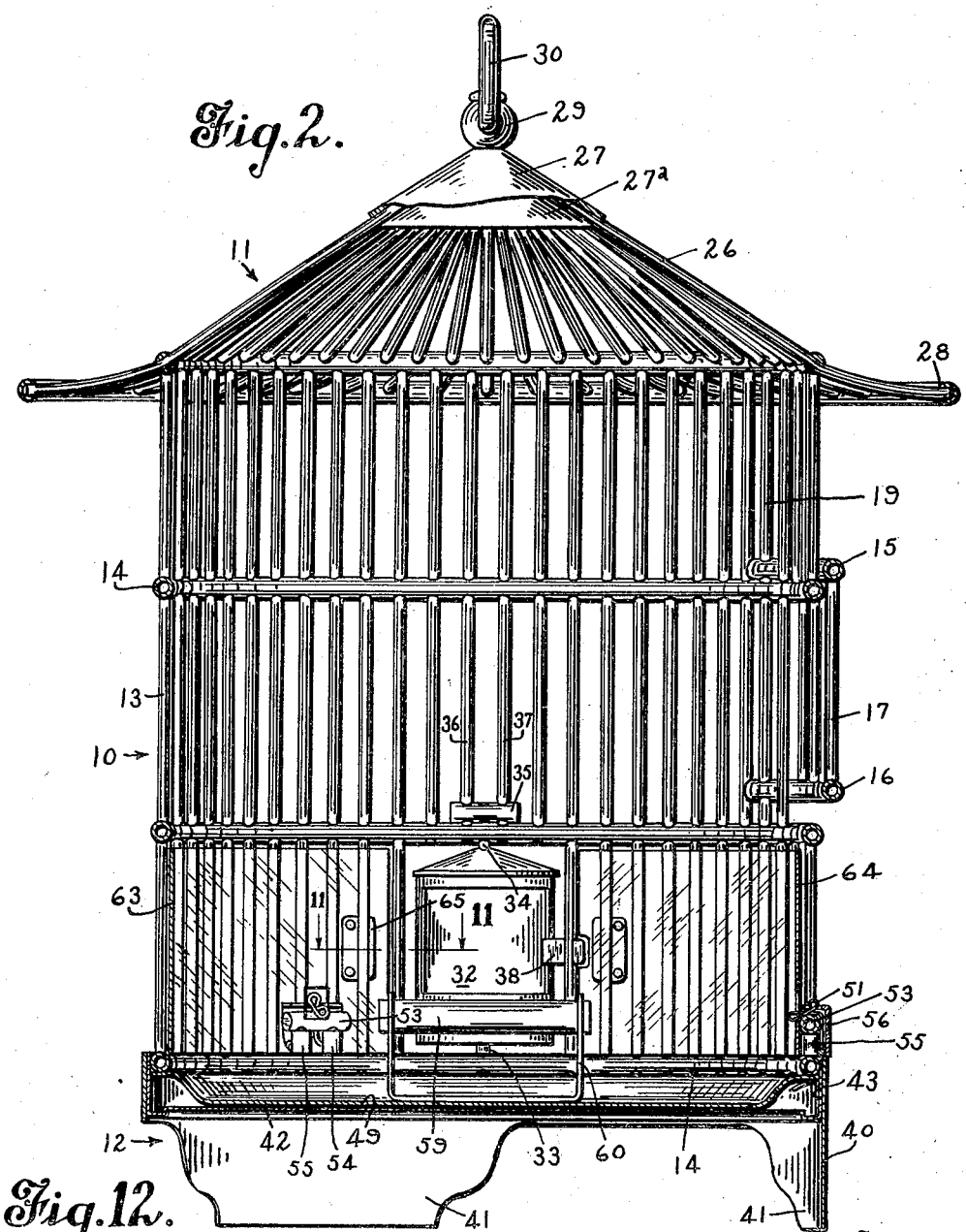
Fig. 2 is a cross sectional view of the cage.
Figure 12:
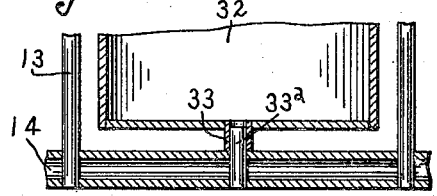
Fig. 12 is a sectional view through one of the receptacles.
Figures 8, 9:
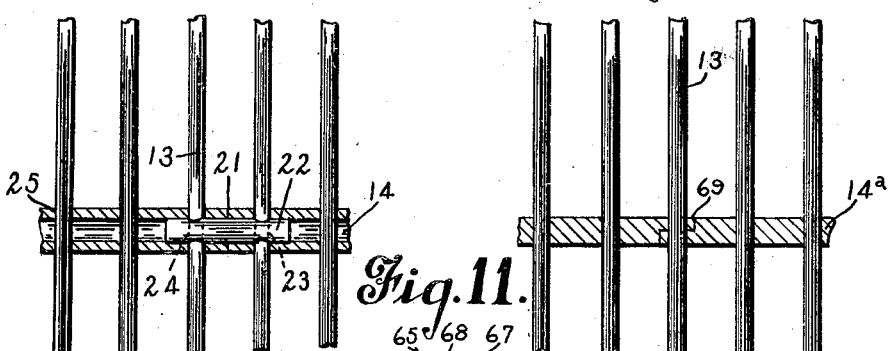
Fig. 8 is a sectional view through one of the tubular horizontal rails of the cage, showing the manner of securing the vertical bars thereto, and also the manner of joining the two ends of the rail.
Fig. 9 is a view similar to Fig. 8, but showing a modified form of rail.
Figure 11:
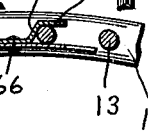
Fig. 11 is a sectional view on line 11—11 of Fig. 2, showing the manner of securing the seed guard in place.
Figure 10:
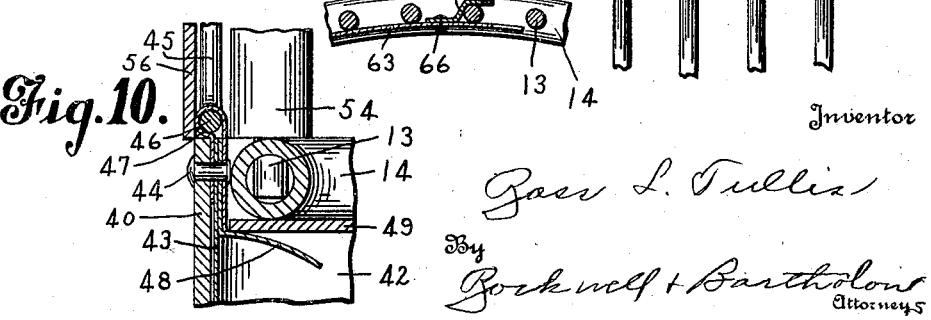
Fig. 10 is an enlarged sectional view similar to Fig. 4, showing the manner of supporting the bottom pan of the cage, and the manner of securing the hook to the bottom portion of the cage.

The rails 14 are, as clearly shown in Figs. 2 and 8, tubular in form. These rails are preferably made out of a length of tubular stock, the ends of which are brought together in abutting relation, as shown at 21, in Fig. 8. A short rod of pyralin or the like 22, is inserted in the ends of the rail, this rod being perforated at 23 and 24 for the passage therethrough of the adjacent vertical rods 13. It will be seen, therefore, that with this construction, any tendency of the ends of the rails to pull apart, is resisted. In addition, a solvent is applied to the joint between the abutting ends of the rails which dissolves the material thereof and causes it to fuse or flow together so that substantially a continuous circular rail results. To all intents and purposes, the effect is the same as if an endless tube were used.

As clearly shown in Fig. 8, the rails are perforated at 25 to provide for the passage therethrough of the vertical rods 13. The solvent is likewise applied to these parts, so that the contiguous portions of the rails and rods will be dissolved and will flow together to likewise form a one-piece construction. In this manner, the openings through the tubular rails are effectively closed, so that there is no chance of dirt, lice, or other vermin entering the rails through the openings about the rods. In constructing the cage, the rod may be threaded through the rails and the solvent applied with a brush to the contiguous portions of the rods and rails. When this solvent dries the rails will be held in place upon the rods and the entire cage may then be dipped bodily into the solvent solution. The entire surface of all parts of the cage, which is exposed, will be acted upon by the solvent and dissolved, and the contiguous parts of the various members of the cage will be caused to flow together and unite integrally. When the cage is removed from the solvent and dries, it will be found that a very high finish and bright lustre will have been given to the various parts thereof by this method.

The top 11 of the cage is, in the form shown, of conical shape, and formed by the rods 26, which converge toward and are secured between inner and outer upper cap members 27 and 27$^a$. These rods pass through the upper of the horizontal rails 14, as shown in Fig. 2, and project outwardly for some distance beyond this rail, where they curve slightly upwardly and have their ends inserted through perforations in a rail 28. The rail 28 is of tubular construction and will generally be substantially the same size as the rails 14. To the upper cap members 27 and 27$^a$ is secured a spherical member 29, upon which a swinging ring 30 is mounted, by which the cage may be carried or suspended. It will be understood that the rods 26 will be united to the upper of the rails 14 and to the rail 28 in the manner described in connection with the vertical rods 13.

Food and water receptacles 31 and 32 are provided upon opposite sides of the cage, these receptacles being set in openings arranged by the omission of the parts of the rods 13 between the two lower rails 14. These receptacles are mounted to swing upon a vertical axis so that access may be had to the interior thereof without removing them from the cage. This arrangement consists in the provision of an upper pivot member 34 entering an opening in the top of the receptacle and a lower collar or sleeve member 33 of pyralin, which is fitted tightly in an opening in the bottom of the receptacle, and loosely received, a stud 33$^a$, also of pyralin, secured to the lower rail 14. The upper pivot member is secured to a short bar 35, slidably mounted upon the rods 36 and 37, this member projecting downwardly through an opening in the rail 14 to enter the opening in the top of the receptacle. A latch 38 engages the adjacent vertical rod 13 to releasably secure the receptacle in the proper position. Upon releasing the latch, the receptacle may be swung about the pivot members 33$^a$ and 34 so that access may be had to the interior thereof. If it is desired to remove the receptacle from the cage, this may be done by raising the bar 35 upon the rods 36 and 37, which effects the removal of the pivot 34 from the opening at the upper end of the receptacle, which then may be freely lifted from the cage.

It will be understood that all of the parts above referred to are formed of pyralin or cellulose ester material, with the exception of the upper knob 29 and ring 30, which have an exterior covering of this material but which contain inner metallic cores, as described in my co-pending application, Serial No. 11,272, filed February 24, 1925.

The bottom of the cage 12 comprises an exterior band or base portion 40, which is also of a cellulose ester material, this band being relieved at certain places upon its lower periphery to provide the supporting feet 41. Secured to this band is a bottom member 42, provided with an upstanding peripheral flange 43, which lies closely contiguous to the wall of the member 40, so that the two parts may be secured together by rivets or the like 44, thus effectively securing together these two parts of the bottom portion of the cage. The member 42 may, if desired, be formed of sheet metal so as to give great rigidity to the bottom portion of the cage and assist in retaining the member 40 in shape.

Also secured to the bottom portion of the cage by the rivets 44, are latch members 45, each of these members having a lower horizontal portion 46 passing through the loop 47 of a piece of sheet metal doubled upon itself and having its ends secured by the rivets 44. Between the outer fold of this loop and the flange 43 of the member 42, is secured the vertically extending end of an L-shaped supporting member 48, which projects inwardly from the wall of the bottom portion of the cage. I find it expedient to provide three of such latch members to secure the bottom portion of the cage to the body, although the number may, of course, be varied if desired. Upon the horizontally extending ends of the L-shaped members 48, rests a pan 49 which forms the actual bottom of the cage when in use, and which may be readily removed in order to be cleaned. This pan is also preferably made of pyralin.

It will be noted that while the pan 49 rests upon the lugs 48, the lower rail 14 of the cage body in turn rests upon the pan so that the cage body is supported by the lugs and urged downwardly toward these lugs by the latch members 45.

Figure 4:
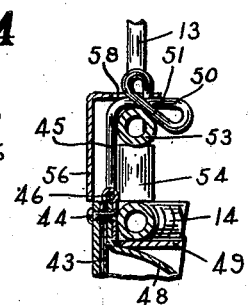
Fig. 4 is a sectional view on line 4—4 of Fig. 3.

The latch member 45 is made from relatively stiff wire, and as shown at 50 in Fig. 4, is bent to extend horizontally at its upper end, then turned downwardly and rearwardly to be doubled upon itself, the rearwardly extending portion being inclined upwardly, as shown at 51, to cross the horizontally extending portion 50. In this manner, the part 51, which, as will be explained more fully hereinafter, engages a part of the body portion of the cage, is adjacent the free end of the latch and therefore resilient, and by reason of this resilience, will bind frictionally against the part of the cage with which it is engaged.

The upper end of the latch 45 is designed to engage over a short bar 53, mounted upon two adjacent vertical rails 13, and spaced from the lower horizontal rail 14, by spacing collars 54 and 55, which are also mounted upon the rods 13. The bar 53 is hollow, as shown in Fig. 4, and the perforations through which pass the rods 13 are sealed in the manner heretofore described. It will be noted that the bar 53 is engaged by the part 51 of the latch member, adjacent the free end of this part. This end will be moved upwardly by such engagement so that the upper end of the latch is in effect a hook member which embraces the bar 53 and effectively holds the bottom of the cage in place.

Figure 3:
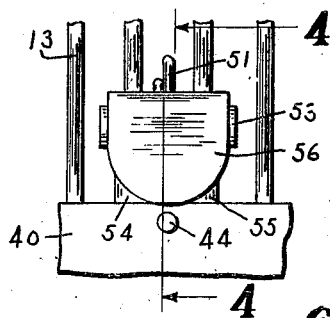
Fig. 3 is a fragmentary elevational view of the latch guard, for retaining in closed position the latch which secures the bottom of the cage to the body portion thereof.
Figure 5:
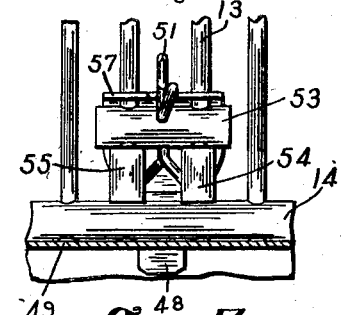
Fig. 5 is a fragmentary elevational view showing the reverse side of the latch and latch guard, the view being taken from the inside of the cage.
Figure 6:
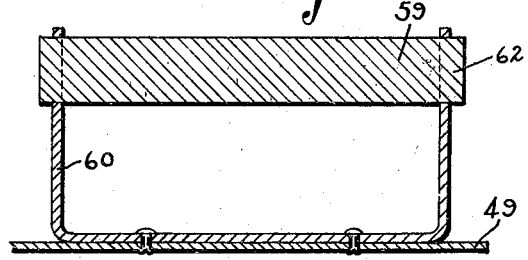
Fig. 6 is a sectional view of the roosts taken on line 6—6 of Fig. 7.
Figure 7:
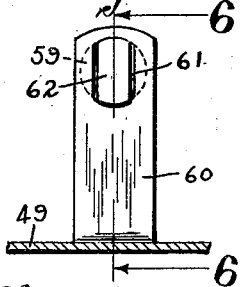
Fig. 7 is an end elevational view of the roosts secured to the pan, which forms part of the bottom portion of the cage.

As an additional precaution to prevent any possibility of the hooks becoming accidentally released, I provide latch guards 56 having horizontal portions 57, slidably mounted upon the bars 13 and provided with an opening or cut-out portion 58 to clear the parts 50 and 51 of the latch when the guard is in its lower position. In this lower position, as shown in Figs. 3, 4 and 5, it will be apparent that the guard lies behind the latch 45 and will prevent this latch swinging outwardly. When it is desired to release the latch, the guard 56 may be slipped upwardly upon the rods 13, so that they do not interfere with the normal operation of the latch members.

Roosts 59 are supported upon the pan 49, by means of U-shaped standards 60, which may be formed of pyralin and riveted or otherwise suitably secured to the pan. The legs of these U-shaped members are provided with elongated openings 61 at their upper ends to receive the reduced ends 62 of the cylindrical roost members 59. It will be obvious that shoulders are provided upon the roost members by the provision of the reduced ends 62, and the legs of the U-shaped supports 60 rest against these shoulders. These legs will be sufficiently resilient so that they may be sprung apart to permit the members 59 to be removed from the cage.

Seed guards 63 and 64 of transparent material such as celluloid, may be provided at the lower portion of the cage to prevent the bird from throwing feed and other refuse on the floor. These guards, as shown, are disposed within the cage body and may be secured in place by the members 65, which likewise may be formed of a cellulose ester material. These members may be riveted to the guard as shown at 66, and are provided with a spaced portion 67 to engage upon the outside of the rod and embrace this rod between the body of the guard and the part 67. The guard may be slightly bent when put in place so that the member 67 will be disposed without the rod 13, and thereafter the natural resiliency of the material of which the guard is made, will cause this member to straighten out and cause the rail to be lodged against the part 68 of the member 65.

In Fig. 9 of the drawings, I have shown a modified form of my invention, wherein I employ rails 14a of solid material instead of hollow tubes, as shown in Fig. 8. The ends of these rails may be joined together by being overlapped, as shown at 69, and one of the rods 13 passed through registering perforations in the overlapped portions thereof. It will be understood that in this construction the solvent is also used to cause the overlapped portions of the contiguous ends of the rails to flow together to form a one-piece structure.

While I have shown and described some preferred embodiments of my invention, it is to be understood that it is not to be limited to the details shown, but is capable of modification and variation within the spirit of the invention and within the scope of the appended claims.

What I claim is:
1. A bird cage comprising a bottom por- tion and a body portion, means on the bottom portion of the cage to support the body portion, means for latching the two portions of the cage together, and common means for securing said latching means and said supporting means to the cage.

2. A bird cage comprising a bottom portion and a body portion, means to secure the two parts of the cage together comprising a latch member, means to secure said latch member, to the bottom portion of the cage, said securing means having a lug secured thereto to extend below and support the cage body.

3. A bird cage comprising a bottom portion and a body portion, means to secure the two parts of the cage together comprising latch members, means to secure said latch members to the bottom portion of the cage, said securing means having lugs secured thereto to extend below and support the cage body, and a bottom pan supported on said lug below the cage body.

4. A bird cage comprising a bottom portion and a body portion, a latch member for securing the two parts of the cage together, said bottom portion having a peripheral wall, a lug projecting inwardly from said wall to lie below and support the body portion of the cage, and common means for securing the latch member and the lug to the bottom portion of the cage.

5. A bird cage having a body portion formed of horizontal rails and uprightly disposed rods, there being a rail at the upper end of said portion provided with perforations, and a top portion comprising a tip member having rods diverging downwardly therefrom, the rods being passed through perforations in said rail, and extended beyond the rail to form an overhanging flange.

6. A bird cage having a body portion formed of horizontal rails and uprightly disposed rods, there being a rail at the upper end of said portion provided with perforations, and a top portion comprising a tip member having rods diverging downwardly therefrom, the rods being passed through perforations in said rail and extended beyond the rail to form an overhanging flange, and a rail of larger diameter than those in the body of the cage provided with perforations to receive the end of the rods forming the top of the cage.

In witness whereof, I have hereunto set my hand this 9th day of February, 1927.

ROSS L. TULLIS.